July 23, 1935.    M. O. TANNER ET AL    2,009,303
RECIPROCATORY PISTON
Filed May 8, 1934
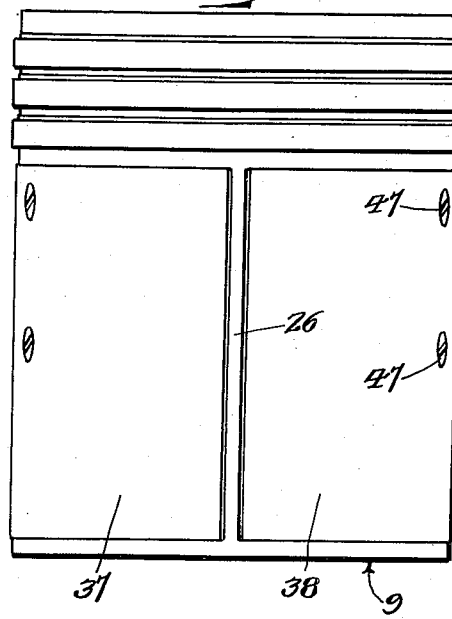
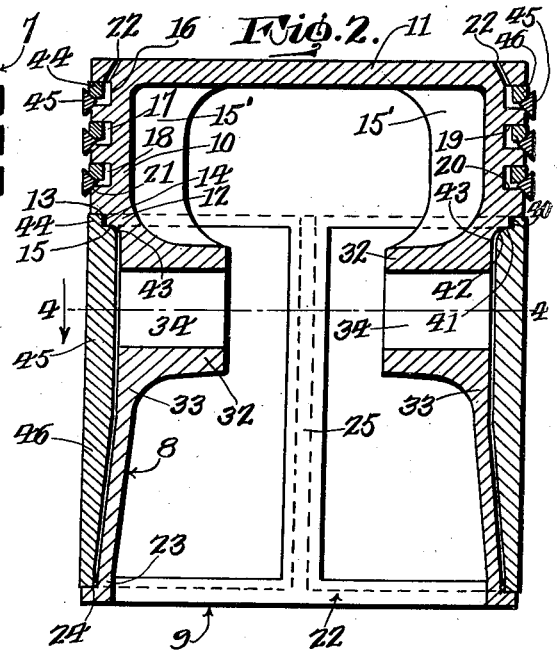
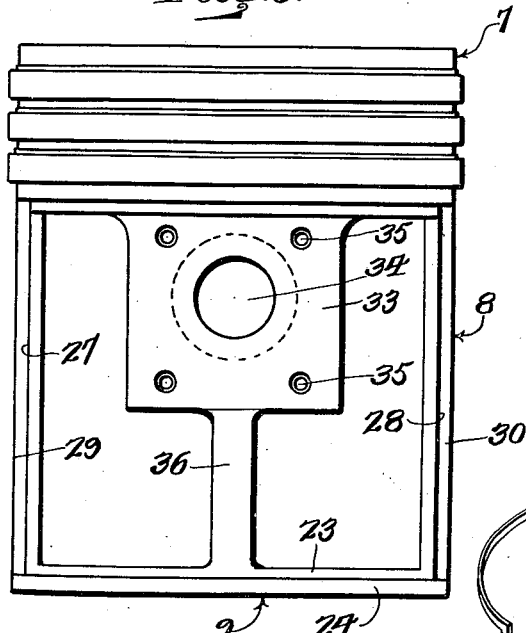
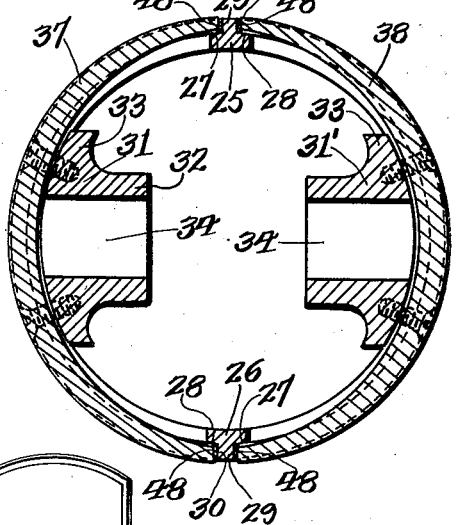
Inventors
Moran O. Tanner
William L. Aiken
Geo. P. Kimmel
Attorney Patented July 23, 1935

2,009,303

UNITED STATES PATENT OFFICE 2,009,303

RECIPROCATORY PISTON

Moran O. Tanner and William L. Aiken, Farrell, Pa.

Application May 8, 1934, Serial No. 724,554

4 Claims. (Cl. 309—11)

This invention relates to a reciprocatory piston and has for its object to provide, in a manner as hereinafter set forth a piston including means to prevent the chattering or slapping thereof relative to a cylinder when the wall of the latter becomes worn.

A further object of the invention is to provide, in a manner as hereinafter set forth a sectional piston for taking up wear while maintaining the formation of a cylinder wall to prevent during the operation of the piston the working out of the wrist pins and the scoring of the wall of the cylinder.

A further object of the invention is to provide the piston with piston ring grooves for the reception of composite piston rings, the grooves being so formed and the rings so constructed to prevent the jamming or binding thereof in the grooves thereby providing an efficient oil seal and more compression.

A further object of the invention is to provide, in a manner as hereinafter set forth, a piston formed to utilize the force of the engine compression for forcing out the piston rings, carried thereby against the cylinder wall and thereby assure automatically perfect compression, perfect seal and freedom from chattering or slapping.

Further objects of the invention are to provide, in a manner as hereinafter set forth, a reciprocatory piston which is simple in its construction, strong, durable, compact, thoroughly efficient in its use, readily assembled, convenient for adjustment to compensate for wear of piston or cylinder wall or either or both, and comparatively inexpensive to manufacture.

To the above ends essentially, and to others which may hereinafter appear, the invention consists of such parts, and such combination of parts which fall within the scope of the invention as claimed.

In the drawing:—

Figure 1 is an elevation of the piston.

Figure 2 is a vertical sectional view of the piston.

Figure 3 is an elevation of the skeleton body of the piston.

Figure 4 is a section on line 4—4, Figure 2.

Figure 5 is a perspective view of the form of shim employed.

The piston includes an annular unitary skeleton body formed of a forward portion 7, an intermediate portion 8 and a rear portion 9. The portion 8 is of materially greater length than the portions 7, 9. The portion 7 is of materially greater length than the portion 9.

The portion 7 includes an annular body part 10 open at its inner end and closed at its outer end by a head 11. The inner end of body part 10 is formed with an annular boss 12 having its outer side edge inset with respect to the outer face of said body part. The boss 12 in connection with the inner edge of body part 10 provides a shoulder 13, an abutment 14 and a shoulder 15 and each of which is of annular form. The shoulders 13, 15 are disposed, in cross section in spaced parallel planes. The abutment 14 extends from the inner side of shoulder 13 to the outer side of shoulder 15. The inner face of portion 7 is formed with a pair of spaced diametrically opposed reinforcing ribs or webs 15' extending rearwardly from the inner edge of boss 12'. The outer periphery of body part 10 is formed with a set of spaced circumferentially extending endless grooves 16, 17 and 18. Each has its leading wall 19 squared and its follower wall having its major portion 20 squared and its outer corner 21 beveled and inclining rearwardly throughout substantially at an angle of 30°. The cross sectional length of portion 20 is of materially greater length than the cross sectional length of portion 21. The portion 7 is formed with spaced compression ports 22 leading to the inner side of groove 16 and opening into the latter through its leading wall 19 at the point of joinder of the latter with the inner wall of said groove.

The portion 9 is in the form of an annulus 22 of angle-shaped cross section to form a pair of legs 23, 24 extending at right angles to each other. The leg 23 provides a shoulder. The leg 24 extends outwardly from the rear end of leg 23 and forms a seat.

The section 8 includes a pair of spaced diametrically opposed coupling parts 25, 26 and each has a portion of its forward end integral with the boss 12 and the remaining portion of said end integral with the inner end edge of body part 10. Each of said parts has its rear end integral with the rear portion 9. The parts 25, 26 are of bar-like form and have their outer faces flush with the outer faces of portions 7, 9. Each of the parts 25, 26, on its outer side or face is formed with a pair of oppositely disposed rabbets providing a pair of spaced seats 27, 28 and a pair of spaced parallel shoulders 29, 30. The inner ends of the seats 25, 26 terminate in the inner ends of the shoulders 27, 28 respectively. The seats are arranged inwardly with respect to the outer faces of the portions 7, 9.

The section 8 also includes a pair of spaced diametrically opposed and oppositely extending apertured wrist pin receiving and bearing parts or structures 31, 31', each consisting of a tubular part 32 formed at its outer end with a flange 33 extending laterally therefrom. The flange 33 in front elevation appears as of rectangular contour. The bore 34 of part 32 has its wall spaced from the forward end, sides and rear end of flange 33. The outer end of each of the structures 31, 31' are of arcuate contour. The said structures are integral with and inset with respect to the boss 12. The ribs 15' at their rear ends merge into the tubular parts 32. The structures are arranged at right angles to the coupling parts 25, 26 and spaced equi-distant therefrom. The outer face of each flange 33 is formed with spaced inclined sockets 35 having the walls thereof threaded. Formed integral centrally with the rear end of each flange 33 is the forward end of a coupling part 36 which inclines outwardly from the flange. The rear end of the coupling part 36 is integral with the leg 23 of portion 9.

Associated with the portion 8 and adjustably connected to the flanges 33 is a pair of oppositely disposed wear compensating elements 37, 38 of skirt like-form and of a contour slightly less than a half circle. Each of said elements has its outer face upon a greater arc than the arc of its inner face whereby it will gradually increase in thickness from each side edge thereof to its lengthwise center. This structural arrangement provides for the seating of the sides of said elements upon the seats 28, 29. These latter are spaced outwardly with respect to the inner face of the annular body providing the piston. The arc of the inner face of each of said elements conforms to the arc at the outer ends of bearing parts or structures 31, 31'. The forming of each of said elements with its outer face upon a greater arc than that of its inner face provides it with a narrow inner end and a pair of narrow side edges. The said inner end and side edges correspond substantially in width to the legs 23 and shoulders 29, 30 respectively to maintain the projecting parts of the sides and inner end edges of each wear-compensating element at a possible minimum when the element is in its normal or adjusted position. Each of said elements is formed in the inner side of its forward edge with a rabbet to provide an abutment 40 and a shoulder 41. The forward inner corner 42 of each element is rounded to conform to the shape of the outer face of a flange 33 at the forward end of such face as is indicated at 43. In lengthwise section each element is formed with a narrow forward stretch 44, an intermediate stretch 45 of uniform thickness and a rear stretch 46 at the inner end of the element. The inner face of stretch 46 inclines outwardly from its forward to its inner end to conform to the inclination of a coupling part 36. Each element is of a length to extend from shoulder 13 of portion 7 to leg 24 of portion 9 and of a width to engage a seat of each of the coupling parts 25, 26. When the elements 37, 38 are mounted in position they oppose the structures 31, 31' coupling parts 36, the shoulders 13, 15 abutment 14, seats 25, 26, shoulders 29, 30, and legs 23, 24. The elements 37, 38 are adjustably secured in position by countersunk inclined holdfast devices 47 extending therethrough and threadedly engaging with the walls of the sockets 35.

The elements 37, 38 are adjusted laterally when necessary by the interposing between each element and the coupling parts 25, 26 and 36 a skeleton shim 48 of semi-circular form. The shims are arranged against abutment 14 and leg 23 and between the shoulders 29, 30.

Arranged in each piston ring groove is a piston ring formed of an annular split leading section 44 and an annular split follower section 45. In cross section the leading section 44 is squared with the exception that its inner outer corner is beveled as at 46. In cross section the follower section 45 is in the form of an equi-lateral triangle. The beveled inner corner 46 of the leading section rides against the leading face of the follower section 45. The leading face of the latter inclines in a direction corresponding to the direction of inclination of the beveled corner 46. The follower face of the follower section 45 rides against and is inclined in a direction corresponding to that of the inclination of the outer beveled corner 21 of the follower wall of that groove in which the leading section 44 is arranged and into which a portion of the follower section extends.

The ports or ducts in the forward portion of the body part 10 which lead as shown, that is to the rear of a piston ring, may or may not be employed as a part of the piston construction, but if employed they provide for the force of the engine compression to force the ring against the cylinder wall and automatically assure perfect compression, perfect seal and freedom from chattering or slapping during the operation of the piston.

What we claim is:—

1. In a reciprocatory piston, an annular unitary body having a closed outer and open inner end forward portion, an intermediate annular skeleton portion and an annular rear portion, said intermediate portion including a pair of spaced parallel oppositely extending combined coupling and wrist pin carrying parts at diametrically opposed points thereof, said parts being formed with openings extending from their inner to their outer faces and inset throughout with respect to the outer faces of and integral with said forward and rear portions, said intermediate portion including a pair of duplex rabbeted coupling parts disposed at diametrically opposite points thereof and spaced from the sides of said wrist pin carrying parts, said rabbeted coupling parts being integral with said forward and rear portions, and a pair of oppositely disposed wear-take-up elements seated upon the rabbeted portions of said coupling parts, closing the outer ends of said openings, completely concealing and adjustably connected to said wrist pin carrying parts, said elements encompassing parts of said forward and rear portions.

2. In a reciprocatory piston, an annular unitary body having a closed outer and open inner end forward portion, an intermediate annular skeleton portion and an annular rear portion, said intermediate portion including a pair of spaced parallel oppositely extending combined coupling and wrist pin carrying parts at diametrically opposed points thereof, said parts being formed with openings extending from their inner to their outer faces and inset throughout with respect to the outer faces of and integral with said forward and rear portions, said intermediate portion including a pair of duplex rabbeted coupling parts disposed at diametrically opposite points thereof and spaced from the sides of said wrist pin carrying parts, said rabbeted coupling parts being integral with said forward and rear portions, and a pair of oppositely disposed wear-take-up elements seated upon the rabbeted portions of said coupling parts, closing the outer ends of said openings, completely concealing and adjustably connected to said wrist pin carrying parts, said elements encompassing parts of said forward and rear portion, each of said elements being of semi-circular contour gradually increasing in thickness from each side thereof to its lengthwise center, said forward portion being formed at its rear end with a pair of shoulders separated by an abutment, and each of said elements having its forward end provided with means opposing said shoulders and abutments.

3. In a reciprocatory piston, a unitary body closed at its outer end and open at its inner end, said body formed of an annular outer portion, an annular intermediate skeleton portion and an annular rear portion, said intermediate portion including a pair of spaced parallel oppositely disposed wrist pin carrying parts, each formed with an opening extending from its inner to its outer face, said parts being inset throughout with respect to the outer faces of said outer and rear portions, the inner end of said outer portion being formed with an inset boss, said parts being integral at one end with said boss, said outer portion being formed with spaced internal webs integral with said parts, said intermediate portion being formed with spaced coupling parts disposed centrally with respect to and connecting the other ends of said carrying parts with said rear portion, said rear portion being of angle shape to form an inner leg and an outwardly directed leg, said inner leg being integral with said coupling parts, and said intermediate portion being formed with a pair of spaced rabbeted coupling parts spaced from the said other coupling parts and integral with the inner end of said outer portion and the inner leg of the said rear portion, and a pair of oppositely disposed wear take-up elements interposed between said outwardly extending leg and the inner end of said outer portion, said elements opposing said first mentioned coupling parts, said boss, completely concealing said carrying parts, closing the outer ends of said openings, opposing said rabbeted coupling parts and being adjustably connected to said carrying parts.

4. In a reciprocatory piston, a unitary body closed at its outer end and open at its inner end, said body formed of an annular outer portion, an annular intermediate skeleton portion and an annular rear portion, said intermediate portion including a pair of spaced parallel oppositely disposed wrist pin carrying parts, each formed with an opening extending from its inner to its outer face, said parts being inset throughout with respect to the outer faces of said outer and rear portions, the inner end of said outer portion being formed with an inset boss, said parts being integral at one end with said boss, said outer portion being formed with spaced internal webs integral with said parts, said intermediate portion being formed with spaced coupling parts disposed centrally with respect to and connecting the other ends of said carrying parts with said rear portion, said rear portion being of angle shape to form an inner leg and an outwardly directed leg, said inner leg being integral with said coupling parts, and said intermediate portion being formed with a pair of spaced rabbeted coupling parts spaced from the said other coupling parts and integral with the inner end of said outer portion and the inner leg of the said rear portion, and a pair of oppositely disposed wear take-up elements interposed between said outwardly extending leg and the inner end of said outer portion, said elements opposing said first mentioned coupling parts, said boss, completely concealing said carrying parts, closing the outer ends of said openings, opposing said rabbeted coupling parts and being adjustably connected to said carrying parts, and a pair of oppositely disposed skeleton shims interposed between said carrying parts, the said boss, rabbeted coupling parts and inner leg.

MORAN O. TANNER.
WILLIAM L. AIKEN.